United States Patent
Fathi et al.

(10) Patent No.: US 11,384,291 B1
(45) Date of Patent: Jul. 12, 2022

(54) PETROCHEMICAL PROCESSING SYSTEMS AND METHODS FOR REDUCING THE DEPOSITION AND ACCUMULATION OF SOLID DEPOSITS DURING PETROCHEMICAL PROCESSING

(71) Applicant: Saudi Arabian Oil Company, Dhahran (SA)

(72) Inventors: Mazin M. Fathi, Damman (SA); Ki-Hyouk Choi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/146,761

(22) Filed: Jan. 12, 2021

(51) Int. Cl.
| | |
|---|---|
| *B01J 19/18* | (2006.01) |
| *C10G 9/16* | (2006.01) |
| *C10G 9/18* | (2006.01) |
| *C10G 9/20* | (2006.01) |
| *C10G 75/00* | (2006.01) |
| *B01J 19/00* | (2006.01) |

(52) U.S. Cl.
CPC ............ *C10G 9/16* (2013.01); *B01J 19/0026* (2013.01); *B01J 19/0053* (2013.01); *C10G 9/18* (2013.01); *C10G 9/20* (2013.01); *C10G 75/00* (2013.01); *B01J 19/1812* (2013.01); *B01J 2219/00247* (2013.01); *B01J 2219/00252* (2013.01)

(58) Field of Classification Search
None
See application file for complete search history.

(56) References Cited

U.S. PATENT DOCUMENTS

| | | | | |
|---|---|---|---|---|
| 2,678,168 | A | * | 5/1954 | Phillips .................. B02C 17/16 241/47 |
| 4,220,518 | A | | 9/1980 | Uchida et al. |
| 4,545,426 | A | * | 10/1985 | Collins .................. B08B 9/053 165/95 |
| 4,647,367 | A | | 3/1987 | Urban et al. |
| 7,156,979 | B2 | * | 1/2007 | Benum .................... C21D 1/72 208/132 |
| 7,964,090 | B2 | | 6/2011 | Iqbal | |

(Continued)

FOREIGN PATENT DOCUMENTS

| | | | |
|---|---|---|---|
| GB | 173242 A | * | 12/1921 |
| WO | 2005068926 A1 | | 7/2005 |

OTHER PUBLICATIONS

Smithells Metals Reference Book, Seventh Edition. 1992. pp. 14-1 to 14-43. (Year: 1992).*

(Continued)

*Primary Examiner* — Jennifer A Leung
(74) *Attorney, Agent, or Firm* — Dinsmore & Shohl LLP

(57) ABSTRACT

The present disclosure is directed to petrochemical processing systems that may include a component including a first surface oriented to contact a process fluid, which may define a plurality of channels. The petrochemical processing systems may further include a plurality of metal spheres disposed at least partially in the plurality of channels. Each one of the plurality of metal spheres may be fixed in place within one of the plurality of channels such that each of the plurality of metal spheres is freely rotatable. Methods for reducing accumulation and formation of solid deposits during petrochemical processing using the petrochemical processing systems are also disclosed.

20 Claims, 6 Drawing Sheets

(56) References Cited

U.S. PATENT DOCUMENTS

| | | |
|---|---|---|
| 9,725,655 B2 | 8/2017 | Gephart et al. |
| 2005/0131263 A1 | 6/2005 | Wolpert et al. |
| 2016/0354814 A1* | 12/2016 | Carson .................. F28G 15/003 |
| 2020/0308491 A1* | 10/2020 | Alvarado ............... H05B 6/107 |

OTHER PUBLICATIONS

G. V. Samsonov. Handbook of the Physicochemical Properties of the Elements. 1968. pp. 438-446. (Year: 1968).*

Wikipedia.com, "Hardness comparison". Retrieved on Oct. 23, 2021. (Year: 2021).*

International Search Report and Written Opinion dated Sep. 20, 2021 pertaining to International application No. PCT/US2021/019012 filed Feb. 22, 2021, 12 pages.

\* cited by examiner

PETROCHEMICAL PROCESSING SYSTEMS AND METHODS FOR REDUCING THE DEPOSITION AND ACCUMULATION OF SOLID DEPOSITS DURING PETROCHEMICAL PROCESSING

BACKGROUND

Field

The present disclosure relates to systems and methods for processing petroleum-based materials and, in particular, systems and methods for reducing the deposition and accumulation of solid deposits during petrochemical processing.

Technical Background

Petroleum-based materials, such as crude oil, can be converted to petrochemical products, such as fuel blending components, olefins, and aromatic compounds, which are basic intermediates for a significant portion of the petrochemical industry. Many petroleum-based materials are converted to petrochemical products at elevated temperatures sufficient to facilitate the catalytic or thermal reaction of hydrocarbons in the petroleum-based materials. However, heating petroleum-based materials to such elevated temperatures may result in the formation of solid materials, which may accumulate as solid deposits in the petrochemical processing systems used to convert the petroleum-based materials into petrochemical products. For example, when a crude oil is heated to temperatures sufficient to thermally crack hydrocarbons in the crude oil, such as during a visbreaker process, solid deposits of petroleum coke, asphaltenes, and salts may form on the surfaces of the petrochemical processing system that are in contact with the heated crude oil.

The excessive accumulation of solid deposits in petrochemical processing systems may hinder heat transfer, restrict flow of petroleum-based materials, and damage the petrochemical processing systems. As a result, the operation of petrochemical processing systems is often halted for hours, days, or even months at a time in order to remove the solid deposits, which may also result in further damage of the petrochemical processing systems. Typically, the accumulation of solid deposits in petrochemical processing systems may be reduced by limiting the petroleum-based materials converted in the petrochemical processing systems or reducing the severity of the operating conditions of the petrochemical processing systems, such as by reducing the maximum operating temperatures. However, such constraints may reduce the efficiency and yield of petrochemical processing systems. Alternatively, the accumulation of solid deposits in petrochemical processing systems may be reduced by using unreactive or inert materials that are resistant to corrosion by the heated petroleum-based materials to construct the petrochemical processing systems. However, the cost of such materials is often prohibitive and prevents their practical incorporation.

SUMMARY

Accordingly, there is an ongoing need for systems and methods for reducing the deposition and accumulation of solid deposits, such as petroleum coke, during petrochemical processing. The systems and methods of the present disclosure include petrochemical processing systems including at least one component that may include a first surface, which may define a plurality of channels. The component may further include a plurality of metal spheres disposed within the channels. The metal spheres may be fixed in place within the channels such that the metal spheres may be freely rotatable. The free rotation of the metal spheres may provide a dynamic heated surface that contacts the petroleum-based materials within the petrochemical processing system. The free rotation of the spheres during operation of the petrochemical processing system may reduce the deposition and accumulation of solid deposits on the first surface of the component.

As a result, downtime of the petrochemical processing system for the removal of solid deposits may be reduced and the efficiency of the petrochemical processing system may be increased. Moreover, the reduction in the deposition and accumulation of solid deposits may be accomplished by the components of the present disclosure without limiting the petroleum-based materials that may be processed in the petrochemical processing system, limiting the operating conditions of the petrochemical processing system, incorporating costly and prohibitive materials, or combinations of these. Furthermore, the enablement of a broad spectrum of petroleum-based materials as feedstocks and more severe operating conditions by the component of the present disclosure may also result in a greater yield of products from the petrochemical processing system, among other features.

According to at least one aspect of the present disclosure, a petrochemical processing system may include a component including a first surface oriented to contact a process fluid, which may define a plurality of channels. The petrochemical processing system may further include a plurality of metal spheres disposed at least partially in the plurality of channels. Each one of the plurality of metal spheres may be fixed in place within one of the plurality of channels such that each of the plurality of metal spheres is freely rotatable.

According to another aspect of the present disclosure, a method for reducing accumulation and formation of solid deposits during petrochemical processing may include passing a hydrocarbon feed through a petrochemical processing system operable to heat the hydrocarbon feed to a temperature suitable to thermally crack hydrocarbons in the hydrocarbon feed and produce an effluent. The petrochemical processing system may include a component including a first surface oriented to contact a process fluid, which may define a plurality of channels. The petrochemical processing system may further include a plurality of metal spheres disposed at least partially in the plurality of channels. Each one of the plurality of metal spheres may be fixed in place within one of the plurality of channels such that each of the plurality of metal spheres is freely rotatable.

Additional features and advantages of the aspects of the present disclosure will be set forth in the detailed description that follows and, in part, will be readily apparent to a person of ordinary skill in the art from the detailed description or recognized by practicing the aspects of the present disclosure.

BRIEF DESCRIPTION OF THE DRAWINGS

The following detailed description of the present disclosure may be better understood when read in conjunction with the following drawings in which.

Reference will now be made in greater detail to various aspects, some of which are illustrated in the accompanying drawings.

DETAILED DESCRIPTION

Figure 1:
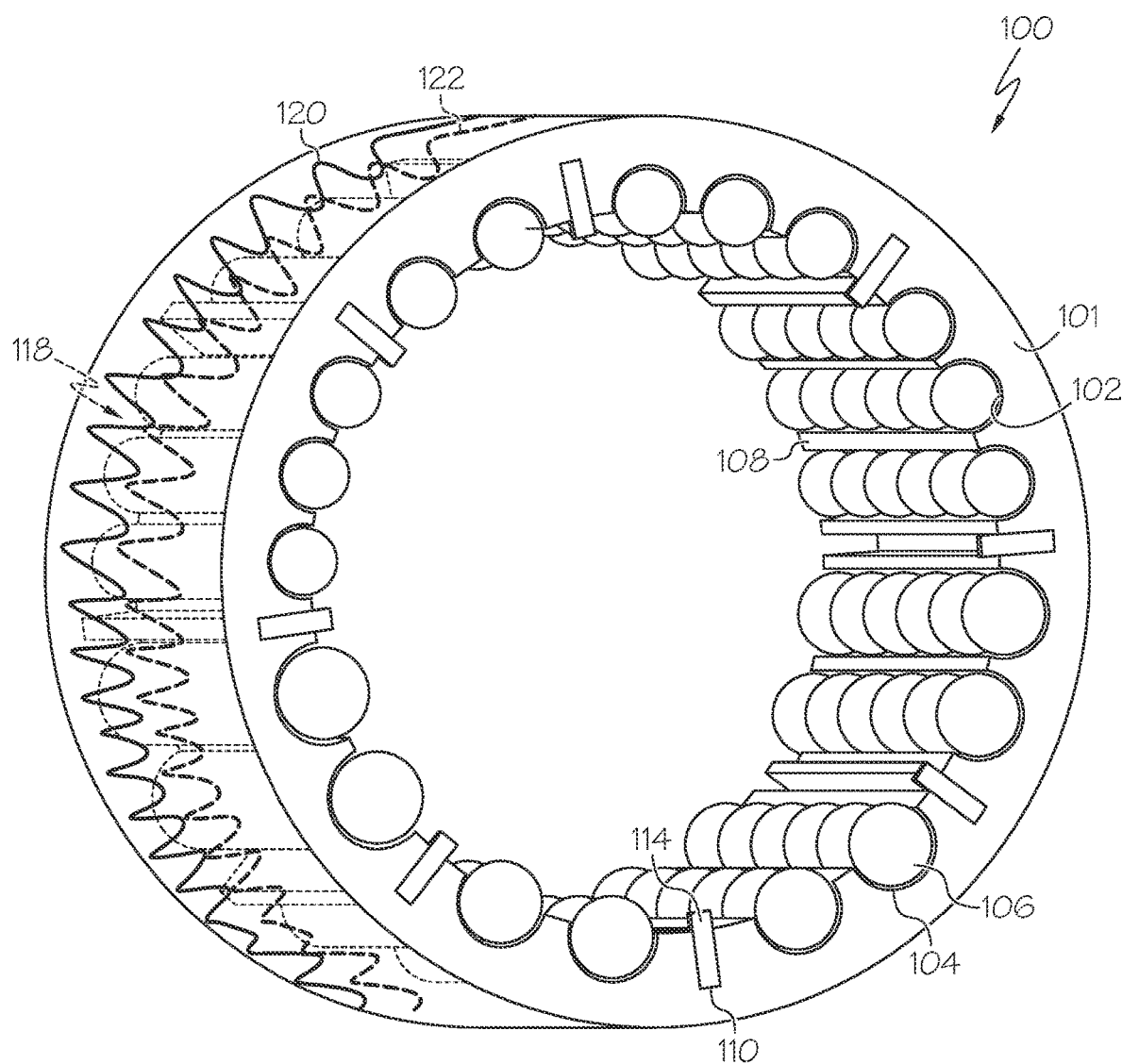
FIG. 1 schematically depicts a perspective view in partial cross-section of a component of a petrochemical processing system, according to one or more aspects of the present disclosure.

The present disclosure is directed to systems and methods for reducing the deposition and accumulation of solid deposits, such as, but not limited to, petroleum coke on surfaces of components of the petrochemical processing system during petrochemical processing. Referring to FIG. 1, a component 100 of a petrochemical processing system is schematically depicted. The component 100 may include a first surface 102, which may define a plurality of channels 104. The component 100 may further include a plurality of metal spheres 106 disposed within the channels 104. The metal spheres 106 may be fixed in place within the channels 104. The free rotation of the metal spheres 106 may reduce the deposition and accumulation of solid deposits on the first surface 102. Without being bound by any particular theory, it is believed that this reduction of the deposition and accumulation of solid deposits on the first surface 102 may be due to the free rotation of the metal spheres 106 providing a dynamic heated surface that contacts the petroleum-based materials. This heated dynamic surface may reduce or prevent solid deposits from depositing on to the surface and accumulating over time.

As a result, downtime of the petrochemical processing system for the removal of solid deposits may be reduced and the efficiency of the petrochemical processing system may be increased. Moreover, this reduction in the deposition and accumulation of solid deposits may be accomplished by the component 100 without limiting the operating conditions of the petrochemical processing system, incorporating costly and prohibitive materials, or both. Furthermore, the enablement of more severe operating conditions by the component 100 may also result in a greater yield of products from the petrochemical processing system, among other features.

As used in the present disclosure, the indefinite articles "a" and "an," when referring to elements of the present disclosure, mean that least one of these elements are present. Although these indefinite articles are conventionally employed to signify that the modified noun is a singular noun, the indefinite articles "a" and "an" also include the plural in the present disclosure, unless stated otherwise. Similarly, the definite article "the" also signifies that the modified noun may be singular or plural in the present disclosure, unless stated otherwise.

As used in the present disclosure, the term "or" is inclusive and, in particular, the term "A or B" refers to "A, B, or both A and B." Alternatively, the term "or" may be used in the exclusive sense only when explicitly designated in the present disclosure, such as by the terms "either A or B" or "one of A or B."

As used in the present disclosure, the term "cracking" refers to any chemical reaction where a molecule having carbon-carbon bonds is broken into more than one molecule by the breaking of one or more of the carbon-carbon bonds; where a compound including a cyclic moiety, such as an aromatic, is converted to a compound that does not include a cyclic moiety; or where a molecule having carbon-carbon double bonds are reduced to carbon-carbon single bonds. As used in the present disclosure, the term "thermal cracking" refers to cracking induced by elevated temperatures.

As used in the present disclosure, the term "crude oil" refers to a mixture of petroleum liquids and gases, including impurities, such as sulfur-containing compounds, nitrogen-containing compounds, and metal compounds, extracted directly from a subterranean formation or received from a desalting unit without having any fractions, such as naphtha, separated by distillation.

As used in the present disclosure, the term "naphtha" refers to an intermediate mixture of hydrocarbon-containing materials derived from crude oil refining and having atmospheric boiling points from 36° C. to 220° C. Naphtha may comprise light naphtha comprising hydrocarbon-containing materials having atmospheric boiling points from 36° C. to 80° C., intermediate naphtha comprising hydrocarbon-containing materials having atmospheric boiling points from 80° C. to 140° C., and heavy naphtha comprising hydrocarbon-containing materials having atmospheric boiling points from 140° C. to 200° C. Naphtha may comprise paraffinic, naphthenic, and aromatic hydrocarbons having from 4 carbon atoms to 11 carbon atoms.

As used in the present disclosure, the terms "downstream" and "upstream" refer to the positioning of components of a system relative to a direction of flow of materials through the system. For example, a second component may be considered "downstream" of a first component if materials flowing through the system encounter the first component before encountering the second component. Likewise, the first component may be considered "upstream" of the second component if the materials flowing through the system encounter the first component before encountering the second component.

As used in the present disclosure, the term "effluent" refers to a stream that is passed out of a reactor, a reaction zone, or a separator following a particular reaction or separation. Generally, an effluent has a different composition than the stream that entered the reactor, reaction zone, or separator. It should be understood that when an effluent is passed to another component or system, only a portion of that effluent may be passed. For example, a slipstream may carry some of the effluent away, meaning that only a portion of the effluent may enter the downstream component or system. The terms "reaction effluent" and "reactor effluent" may be used to particularly refer to a stream that is passed out of a reactor or reaction zone.

As used in the present disclosure, the term "reactor" refers to any vessel, container, or the like, in which one or more chemical reactions may occur between one or more reactants, optionally, in the presence of one or more catalysts. For example, a reactor may include a tank or tubular reactor configured to operate as a batch reactor, a continuous stirred-tank reactor (CSTR), or a plug flow reactor. Example reactors include packed bed reactors, such as fixed bed reactors, and fluidized bed reactors.

As used in the present disclosure, the term "solid deposits" refers to any solid state material that is formed during the processing of a petroleum-based material or otherwise precipitates from the petroleum-based material during processing. For example, solid deposits can refer to petroleum coke that is formed during the thermal cracking of hydrocarbons in petroleum-based materials, as well as salts that remained in solution prior to processing, but precipitated out of the petroleum-based materials during processing due to, for example, the evaporation of the water in which they were in solution.

It should further be understood that streams may be named for the components of the stream, and the component for which the stream is named may be the major component of the stream (such as comprising from 50 wt. %, from 70 wt. %, from 90 wt. %, from 95 wt. %, from 99 wt. %, from 99.5 wt. %, or from 99.9 wt. % of the contents of the stream to 100 wt. % of the contents of the stream). For example, a disclosed "hydrocarbon feed" should be understood to comprise 50 wt. %, from 70 wt. %, from 90 wt. %, from 95 wt. %, from 99 wt. %, from 99.5 wt. %, or from 99.9 wt. % of one or more hydrocarbons.

Referring again to FIG. 1, a perspective view in partial cross-section of a component 100 of a petrochemical processing system of the present disclosure is schematically depicted. As noted previously, the deposition and formation of solid deposits may occur when petroleum-based materials are heated to elevated temperatures, such as temperatures greater than or equal to 250° C. Therefore, the systems and methods of the present disclosure, which may reduce such deposition and accumulation of solid deposits, may be applied to a variety of petrochemical processing systems. Accordingly, the components 100 of the present disclosure may be a component of any petrochemical processing system where petroleum-based materials are heated to a temperature sufficient to cause the deposition and accumulation of solid deposits. For example, the component 100 may be a component of a petrochemical processing system where hydrocarbons of petroleum-based materials are thermally cracked, such as a visbreaker system, a supercritical water system, a steam pyrolysis system, an aqua-conversion system, or combinations of these. Moreover, the component 100 may be any component of the petrochemical processing system where petroleum-based materials are heated to a temperature sufficient to cause the deposition and accumulation of solid deposits, such as petroleum coke. For example, the component 100 may be a reactor, a furnace, a heat exchanger, a process line, or combinations of these.

As depicted in FIG. 1, the component 100 may include a wall 101 having a first surface 102, which may define a plurality of channels 104. The component 100 may further include a plurality of metal spheres 106 disposed within the channels 104. The metal spheres 106 may be fixed in place within the channels 104 such that the positions of the metal spheres 106 are fixed, but the metal spheres 106 are freely rotatable. While the component 100 depicted in FIG. 1 is cylindrical in shape, it should be understood that the component 100 may be various shapes and sizes, such as flat, so long as the component 100 is operable within the particular petrochemical processing system in which it is used. The cylindrical shaped component 100 depicted in FIG. 1 may be suitable for use as a tubular reactor, a process line, or both, but a flat or plate-shaped component 100 may be more suitable for use in a plate reactor or plate and frame heat exchanger.

The wall 101 having the first surface 102 may be made from one or more materials suitable for use within the petrochemical processing system. For example, the wall 101 having the first surface 102 may be made from one or more metals, such as iron, nickel, chromium, copper, molybdenum, or combinations of these. The wall 101 having the first surface 102 may also be made from alloys of these metals, such as a carbon steel, a stainless steel, a nickel-chromium alloy, a nickel-copper alloy, a nickel-chromium-molybdenum alloy, or combinations of these. The particular composition of the wall 101 having the first surface 102 should be selected based on the process conditions of the petrochemical processing system in which the component 100 is used. For example, when processing relatively light petroleum-based materials, such as naphtha, carbon steel or stainless steel may be used despite having inferior resistance to corrosion when compared to a nickel-chromium alloy. However, when processing relatively corrosive petroleum-based materials, such as petroleum residua, materials with superior resistance to corrosion, such as a nickel-chromium-molybdenum alloy may be used.

Figure 2A:
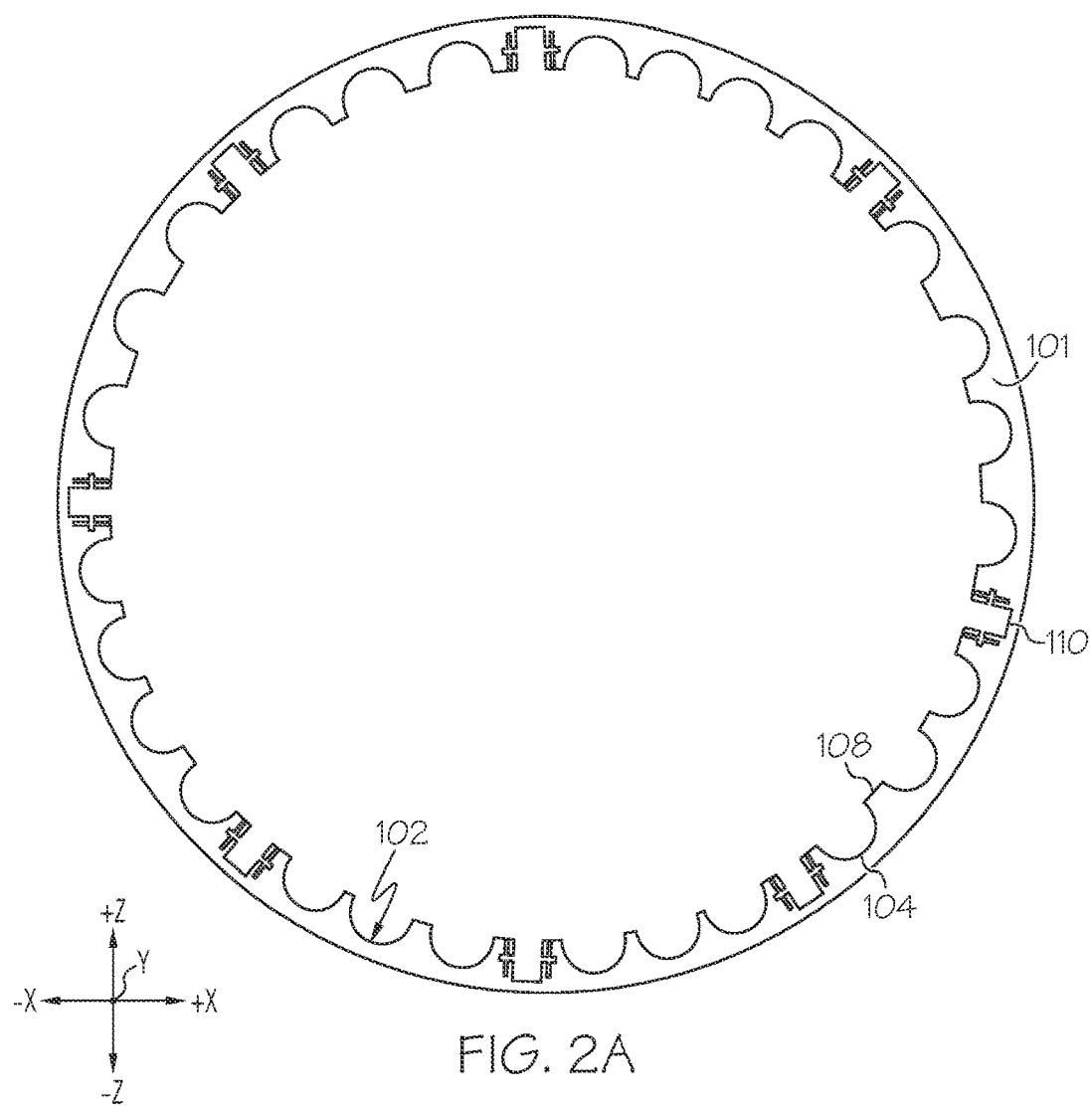
FIG. 2A schematically depicts a cross-sectional view of a plurality of channels defined by the first surface of the component depicted in FIG. 1, according to one or more aspects of the present disclosure.
Figure 2B:
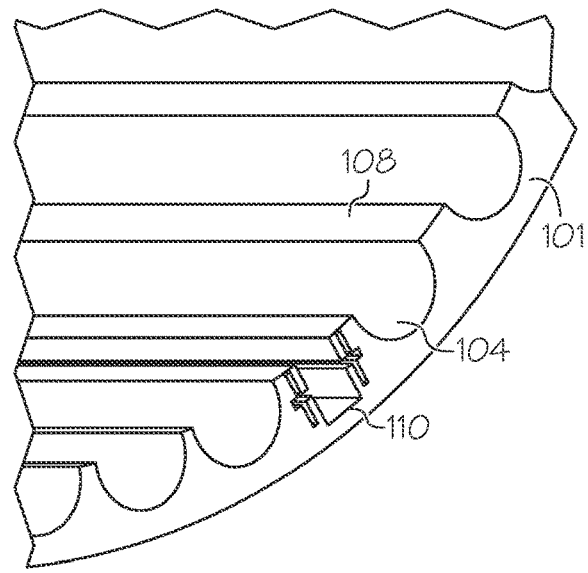
FIG. 2B schematically depicts a perspective view of a portion of the plurality of channels defined by the first surface of the component depicted in FIG. 1, according to one or more aspects of the present disclosure.

As noted previously, the first surface 102 of the wall 101 may define a plurality of channels 104. Referring now to FIGS. 2A and 2B, cross-sectional and perspective views of the channels 104 defined by the first surface 102 of the component 100 are schematically depicted. As depicted in FIGS. 2A and 2B, the channels 104 may be recessed within the first surface 102. That is, the channels 104 may be integral to the wall 101 defining the first surface 102. In embodiments, the wall 101 may include a primary wall and secondary insert wall coupled to a surface of the primary wall. The secondary insert wall may comprise the first surface 102 that defines the plurality of channels 104. In embodiments, the channels 104 may extend in a direction that generally corresponds with the flow of the petroleum-based materials through the component 100. For example, if the petroleum-based materials generally flow through the component 100 in the +/−Y-direction, the channels 104 may also extend along the first surface 102 in the +/−Y-direction. The channels 104 may be any shape suitable for the metal spheres 104 to be fixed in place within the channels 104 while also remaining freely rotatable. The channels 104 may be semicircular (that is, the cross-sectional shapes of the channels 104 are semicircular), squared, angular, or combinations thereof.

While the dimensions of the channels 104 (that is, a width and depth of the channels 104) are not particularly limited, the dimensions of the channels 104 may be selected based on the dimensions of the metal spheres 106 disposed within the channels 104. The width of the channels 104 may be greater than the diameters of the metal spheres 106 in order to enable the free rotation of the metal spheres 106. Similarly, the depth of the channels 104 may be less than or equal to half the diameter of the metal spheres 106 such that half or more of each metal sphere extends outward from the channels 104. When determining the dimensions of the channels 104, the thermal expansion of the metal spheres 106, as well as any other components that may be disposed within the channels 104, may be considered to accommodate the natural expansion of the metal spheres 106 at operating conditions of the petrochemical processing system and to avoid any hindrance of the free rotation of the metal spheres 106. For example, if the composition of the metal spheres 106 has a lesser coefficient of thermal expansion, the channels 104 may only be marginally larger than the metal spheres 106 as the metal spheres 106 are not likely to expand in size enough to hinder their free rotation. In contrast, if the composition of the metal spheres 106 has a greater coefficient of thermal expansion, the width and depth of the channels 104 may be increased in order to prevent the metal spheres 16 from becoming jammed or stuck in the channels 104, which may prevent free rotation of the metal spheres 16.

In embodiments, each of the channels 104 may be separated from the other channels 104 by one or more raised surfaces or ridges 108, one or more latch grooves 110, or combinations of these. The separation of the channels 104 by the ridges 108 and the latch grooves 110 may provide an appropriate distance between the channels 104 such that the metal spheres 106 are evenly spaced across the first surface 102. An appropriate distance between the channels 104 may be determined, at least in part, by the operating conditions of the petrochemical processing system, such as the petroleum-based material passed through the petrochemical processing system, the operating temperatures of the petrochemical processing system, or both. For example, when the operating conditions of the petrochemical processing system are known to result in the formation of significant amounts of solid deposits, the distance between the channels 104 may be reduced, which may reduce the potential for the formation and accumulation of solid deposits on the ridges between the channels 104 (a phenomena commonly referred to as channeling). Moreover, the latch grooves 110 may enable subassemblies of the metal spheres 106, as discussed subsequently, to be coupled to the first surface 102 to position the metal spheres 106 securely within the channels 104.

Referring again to FIG. 1, as noted previously, the metal spheres 106 may be disposed within the channels 104 defined by the first surface 102 of the component 100. The metal spheres 106 may be fixed in place within the channels 104 such that the metal spheres 106 are freely rotatable. The metal spheres 106 may reduce the deposition and accumulation of solid deposits on the first surface 102. Without being bound by any particular theory, it is believed that this reduction or prevention of the formation and accumulation of solid deposits on the first surface 102 may be due to the free rotation of the metal spheres 106, which provides a dynamic heated surface that contacts the petroleum-based materials. Each of the metal spheres 106 may be fixed in place within the channels 104 by, for example, a metal rod that extends through the metal sphere 106, such as through a bore that extends through the metal sphere 106. In embodiments, each of the metal spheres 106 may be fixed in place within the channels 104 by one or more metal rods that are fixed, such as by welding, to antipodal points of the metal sphere. The metals rods may then be coupled to the channels 104, such as by slotting into grooves located within the channels 104.

As noted previously, the metal spheres 106 may be fixed in place within the channels 104 such that the positions of the metal spheres 106 are fixed, but the metal spheres 106 are freely rotatable. In embodiments, the metal spheres 106 may be fixed in place such that they rotate in the same direction as the flow of petroleum-based materials through the component 100. For example, if the petroleum-based materials generally flow through the component 100 in the +/−Y-direction, each of the metal spheres 106 may be freely rotatable about an axis that is perpendicular to the +/−Y-direction, such as, for example, perpendicular to a line normal to the first surface 102. Without being bound by any particular theory, it is believed that fixing the metal spheres 106 in such a manner may enable the metal spheres 106 to be rotated at sufficient speeds by the petroleum-based materials passed through the component 100.

The metal spheres 106 may be selected based on a variety of factors. The composition, density, coefficient of thermal expansion, melting point, compressive and tensile strengths, bulk modulus, and hardness of the metal spheres 106 may all be considered in view of the petrochemical processing system. For example, the repeated heating and cooling of the metal spheres 106 that may occur during operation of the petrochemical processing system may result in repeated thermal expansion and contraction, which may induce mechanical fatigue crevices in the metal spheres 106. As such, the metal spheres 106 may be selected to have a lesser coefficient of thermal expansion in order to reduce the thermal expansion and contraction that occurs.

The metal spheres 106 may be made from materials suitable for use within the petrochemical processing system. For example, the metal spheres 106 may be made from one or more metals, such as iron, nickel, chromium, copper, molybdenum, or combinations of these. The metal spheres 106 may also be made from alloys of these metals, such as a carbon steel, a stainless steel, a nickel-chromium alloy, a nickel-copper alloy, a nickel-chromium-molybdenum alloy, or combinations of these. The particular composition of the metal spheres 106 should be selected based on the process conditions of the petrochemical processing system in which the component 100 is used and, in embodiments, may be the same materials as the first surface 102. For example, when processing relatively light petroleum-based materials, such as naphtha, carbon steel or stainless steel may be used despite having inferior resistance to corrosion when compared to a nickel-chromium alloy. However, when processing corrosive petroleum-based materials, such as petroleum residua, materials with superior resistance to corrosion, such as a nickel-chromium-molybdenum alloy may be used.

The metal spheres 106 may have diameters suitable to reduce or prevent the formation and accumulation of solid deposits on the first surface 102 of the component 100. Diameters suitable to reduce the formation of solid deposits on the first surface 102 of the component 100 may be from 1 centimeter (cm) to 100 cm. For example, the metal spheres 106 may have a diameter of from 1 cm to 20 cm, from 1 cm to 10 cm, from 1 cm to 8 cm, from 1 cm to 6 cm, from 1 cm to 4 cm, from 1 cm to 2 cm, from 2 cm to 20 cm, from 2 cm to 10 cm, from 2 cm to 8 cm, from 2 cm to 6 cm, from 2 cm to 4 cm, from 4 cm to 20 cm, from 4 cm to 10 cm, from 4 cm to 8 cm, from 4 cm to 6 cm, from 6 cm to 20 cm, from 6 cm to 10 cm, from 6 cm to 8 cm, from 8 cm to 20 cm, from 8 cm to 10 cm, or from 10 cm to 20 cm. When the metal spheres 106 are too small, such as when the metal spheres 106 have diameters less than 1 cm, even minor buildup of solid deposits on the first surface 102 of the component 100 may cover portions of the metal spheres 106, prevent the free rotation of the metal spheres 106, or both. This may effectively create stagnant portions of the first surface 102, which may facilitate the further formation and accumulation of solid deposits.

The metal spheres 106 may have densities suitable for operation within the component 100. Densities suitable for operation within the component 100 may be from 5 grams per cubic centimeter ($g/cm^3$) to 30 $g/cm^3$. For example, each of the metal spheres 106 may have a density of from 5 $g/cm^3$ to 30 $g/cm^3$, from 5 $g/cm^3$ to 25 $g/cm^3$, from 5 $g/cm^3$ to 20 $g/cm^3$, from 5 $g/cm^3$ to 15 $g/cm^3$, from 5 $g/cm^3$ to 10 $g/cm^3$, from 10 $g/cm^3$ to 30 $g/cm^3$, from 10 $g/cm^3$ to 25 $g/cm^3$, from 10 $g/cm^3$ to 20 $g/cm^3$, from 10 $g/cm^3$ to 15 $g/cm^3$, from 15 g/cm³ to 30 g/cm³, from 15 g/cm³ to 25 g/cm³, from 15 g/cm³ to 20 g/cm³, from 20 g/cm³ to 30 g/cm³, from 20 g/cm³ to 25 g/cm³, or from 25 g/cm³ to 30 g/cm³. When the metal spheres 106 are not dense enough, such as when the metal spheres 106 have a density less than 5 g/cm³, the metal spheres 106 may be more susceptible to erosion and corrosion caused by contact with heated petroleum-based materials. In contrast, when the metal spheres 106 are too dense, such as when the metal spheres 106 have a density greater than 30 g/cm³, the weight of the metal spheres 106 may exceed the operation limits of the component 100 and cause mechanical deterioration or failure of the component 100. Moreover, the density of the metal spheres 106 may be an indicator of the bulk modulus of the metal spheres 106, which is a measure of the metal spheres' 106 ability to resist deformation when under compression, such as during operation of the petrochemical processing system.

The metal spheres 106 may be suitably hard for operation within the component 100. A suitable hardness for operation within the component 100 may be greater than or equal to 40 on the Rockwell "C" Scale when measured according to ASTM E18-20. For example, each of the metal spheres 106 may have a hardness of from 40 to 68, from 40 to 64, from 40 to 60, from 40 to 56, from 40 to 52, from 40 to 48, from 40 to 44, from 44 to 68, from 44 to 64, from 44 to 60, from 44 to 56, from 44 to 52, from 44 to 48, from 48 to 68, from 48 to 64, from 48 to 60, from 48 to 56, from 48 to 52, from 52 to 68, from 52 to 64, from 52 to 60, from 52 to 56, from 56 to 68, from 56 to 64, from 56 to 60, from 60 to 68, from 60 to 64, or from 64 to 68 on the Rockwell "C" Scale when measured according to ASTM E18-20. The hardness of the metal spheres 106 is directly proportional to the compressive and tensile strengths of the metal spheres 106. Moreover, the hardness of the metal spheres 106 is directly proportional to the ability of the metal spheres 106 resist deformation by stretching, compression, penetration, indentation, and scratching. When the metal spheres 106 are not hard enough, such as when the metal spheres 106 have a hardness less than 40 on the Rockwell "C" Scale when measured according to ASTM E18-20, the metal spheres 106 may be more susceptible to erosion and corrosion during the operation of the petrochemical processing system, either due to contact with heated petroleum-based materials, repeated rotation, or both.

The metal spheres 106 may be subjected to a heat treatment prior to use in the component 100. Suitable heat treatments may be conducted at temperatures from 750 degrees Celsius (° C.) to 1,500° C. For example, the metal spheres 106 may be heat treated at a temperature of from 750° C. to 1,500° C., from 750° C. to 1,350° C., from 750° C. to 1,200° C., from 750° C. to 1,050° C., from 750° C. to 900° C., from 900° C. to 1,500° C., from 900° C. to 1,350° C., from 900° C. to 1,200° C., from 900° C. to 1,050° C., from 1,050° C. to 1,350° C., from 1,050° C. to 1,200° C., or from 1,200° C. to 1,350° C. prior to use in the component 100. Without being bound by any particular theory, it is believed the heat treatment may harden the metal spheres 106, such that each of the metal spheres 106 has a hardness as discussed previously in the present disclosure. When the metal spheres 106 are not heat treated or are heat treated at an unsuitable temperature, such as less than 750° C. or greater than 1,500° C., prior to use in the component 100, the metal spheres 106 may not be suitably hard for operation within the component 100.

Figure 3:
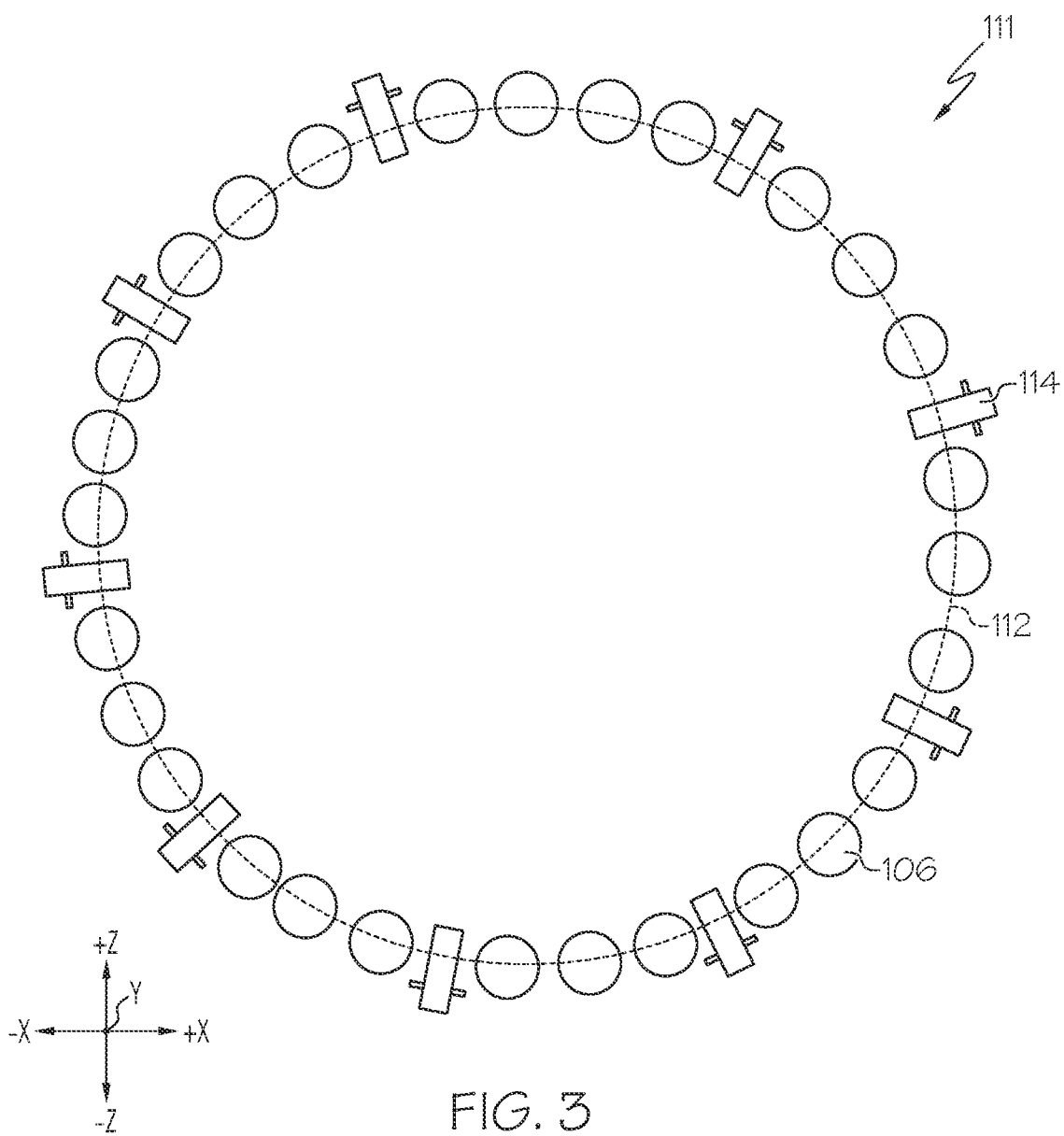
FIG. 3 schematically depicts a sub-assembly of metal spheres, according to one or more aspects of the present disclosure.

In embodiments, the metal spheres 106 may be coupled together in a plurality of sub-assemblies, which may each be disposed within the channels 104. Referring now to FIG. 3, a plurality of metal spheres 106 coupled together in such a sub-assembly 111 is schematically depicted. As depicted in FIG. 3, the metal spheres 106 may be coupled together in a sub-assembly 111 by a coupling member 112 that may extend through each of the metal spheres 106, such as through a bore oriented along an axis of each of the metal spheres 106. While the sub-assembly 111 depicted in FIG. 3 is circular, it should be understood that the sub-assembly 111 may be linear or have other various shapes and sizes, so long as the sub-assembly 111 may be coupled to the first surface 102 of the component 100 in which it is used to position the metal spheres 106 within the channels 104. The circular sub-assembly 111 depicted in FIG. 3 may be suitable for use with a cylindrical shaped component 100, such as the component depicted in FIG. 1, but a linear sub-assembly 111 may be more suitable for use with a component 100 having a plate shape.

The coupling member 112, which may be, for example, a ring or a rod, may be made from materials suitable for use within the petrochemical processing system. For example, the coupling member 112 may be made from one or more metals, such as iron, nickel, chromium, copper, molybdenum, or combinations of these. The coupling member 112 may also be made from alloys of these metals, such as a carbon steel, a stainless steel, a nickel-chromium alloy, a nickel-copper alloy, a nickel-chromium-molybdenum alloy, or combinations of these. The particular composition of the coupling member 112 should be selected based on the process conditions of the petrochemical processing system in which the component 100 is used and, in embodiments, may be the same material as the wall 101 having the first surface 102, the metal spheres 106, or both. For example, when processing relatively light petroleum-based materials, such as naphtha, carbon steel or stainless steel may be used despite having inferior resistance to corrosion when compared to a nickel-chromium alloy. However, when processing corrosive petroleum-based materials, such as petroleum residua, materials with superior resistance to corrosion, such as a nickel-chromium-molybdenum alloy may be used.

The coupling member 112 may have a size suitable to facilitate the extension of the coupling member 112 through the metal spheres 106. Sizes suitable to facilitate the extension of the coupling member 112 through the metal spheres 106 may include cross-sectional diameters of from 0.5 cm to 10 cm. For example, the coupling member 112 may have a cross-sectional diameter of from 0.5 cm to 5 cm, from 0.5 cm to 4 cm, from 0.5 cm to 3 cm, from 0.5 cm to 2 cm, from 0.5 cm to 1 cm, from 1 cm to 10 cm, from 1 cm to 5 cm, from 1 cm to 4 cm, from 1 cm to 3 cm, from 1 cm to 2 cm, from 2 cm to 10 cm, from 2 cm to 5 cm, from 2 cm to 4 cm, from 2 cm to 3 cm, from 3 cm to 10 cm, from 3 cm to 5 cm, from 3 cm to 4 cm, from 4 cm to 10 cm, from 4 cm to 5 cm, or from 5 cm to 10 cm. When the coupling member 112 is too small, such as when the coupling member 112 has a cross-sectional diameter less than 0.5 cm, the coupling member 112 may be more susceptible to mechanical failure during the operation of the petrochemical processing system. Conversely, when the coupling member 112 is too large, such as when the coupling member 112 has a cross-sectional diameter greater than 10 cm, excess amounts of material may be required to be removed from the metal spheres 106 in order to form a bore suitable for the coupling member 112 to extend through. When excess amounts of material are removed from the metal spheres 106, the mechanical strength of the metal spheres 106 may be negatively affected. It should be understood that the size of the coupling member 112 should be selected based on the size of the metal spheres 106. For example, when the dimeter of the metal spheres 106 is 1 cm, a coupling member 112 having a cross-sectional diameter greater than 0.5 cm may not be suitable for use with the metal spheres 106. In particular, a borehole large enough to accommodate the coupling member 112 may require the removal of excess material from the metal spheres 106 or may be larger than the diameter of the metal spheres 106 and, as a result, unable to be drilled.

The number and size of the metal spheres 106 included in each sub-assembly 111 may be determined, at least in part, by the number and size of the channels 104 defined by the first surface 102 of the component 100. For example, when six channels having diameters of 50 cm are defined by the first surface 102, each sub-assembly may comprise six metal spheres 106 having diameters less than 50 cm. The number and size of the metal spheres 106 included in each sub-assembly 111 may also be determined, at least in part, by the operating conditions of the petrochemical processing system, such as the petroleum-based material passed through the petrochemical processing system, the operating temperatures of the petrochemical processing system, or both. For example, when the operating conditions of the petrochemical processing system is known to result in the formation of significant amounts of solid deposits, the size and number of the metal spheres 106 may be selected such that the space between the metal spheres 106 is reduced as much as possible without hindering the free rotation of the metal spheres 106. Without being bound by any particular theory, it is believed that when the spaces between the metal spheres 106 is reduced, the potential for the formation of solid deposits within the spaces between the metal spheres 106 (a phenomena commonly referred to as channeling) may be reduced.

In embodiments, the sub-assembly 111 may further comprise one or more latches 114, which may be disposed between two or more of the metal spheres 106 on the coupling member 112. The latches 114 may secure the sub-assembly 111 within the component 100 by being disposed within the latch grooves 110 defined by the first surface 102 of the component 100. By securing the sub-assembly 111 at select points within the component 100, the metal spheres 106 may be fixed in place within the channels 104 without hindering the free rotation of the metal spheres 106. Each of the latches 114 may be a metal wedge having dimensions sufficient to enable each of the latches 114 to be slotted or inserted into each of the latch grooves 110. Once slotted into each of the latch grooves 110, each of the latches 114 may be secured within their respective latch grooves 110 in order to prevent their dislodgment during operation of the petrochemical processing system. The latches 114 may be secured within the latch grooves 110 by clamps, screws, clips, pins, interlocking surfaces, or combinations of these. Other known methods of attaching the latches 114 to the first surface 102 are contemplated.

The latches 114 may be made from materials suitable for use within the petrochemical processing system. For example, the latches 114 may be made from one or more metals, such as iron, nickel, chromium, copper, molybdenum, or combinations of these. The latches 114 may also be made from alloys of these metals, such as a carbon steel, a stainless steel, a nickel-chromium alloy, a nickel-copper alloy, a nickel-chromium-molybdenum alloy, or combinations of these. The particular composition of the latches 114 should be selected based on the process conditions of the petrochemical processing system in which the component 100 is used and, in embodiments, may be made from the same materials as the first surface 102, the metal spheres 106, the coupling member 112, or combinations of these. For example, when processing relatively light petroleum-based materials, such as naphtha, carbon steel or stainless steel may be used despite having inferior resistance to corrosion when compared to a nickel-chromium alloy. However, when processing corrosive petroleum-based materials, such as petroleum residua, materials with superior resistance to corrosion, such as a nickel-chromium-molybdenum alloy may be used.

Figure 4A:
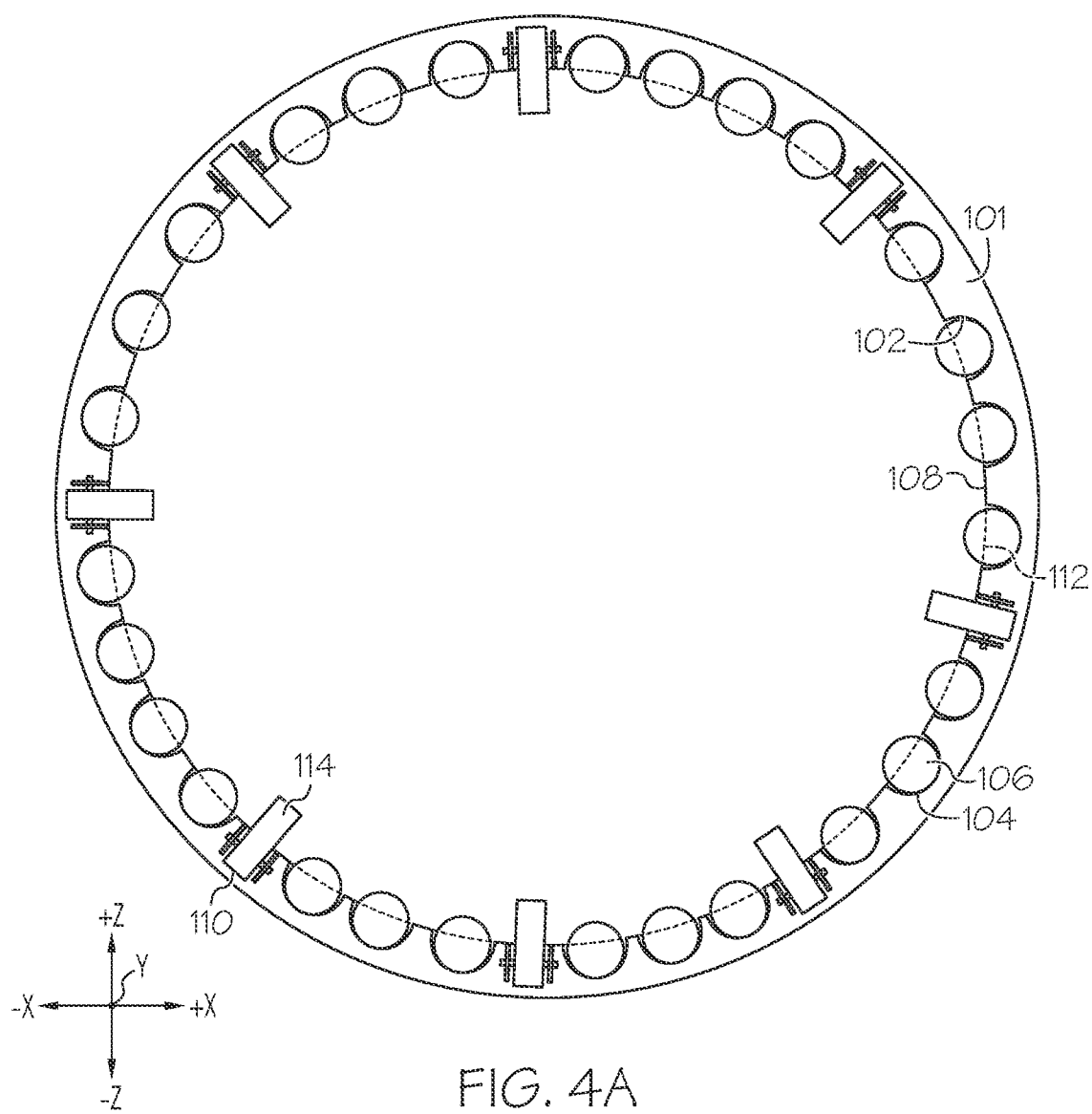
FIG. 4A schematically depicts a cross-sectional view of the component depicted in FIG. 1, according to one or more aspects of the present disclosure.
Figure 4B:
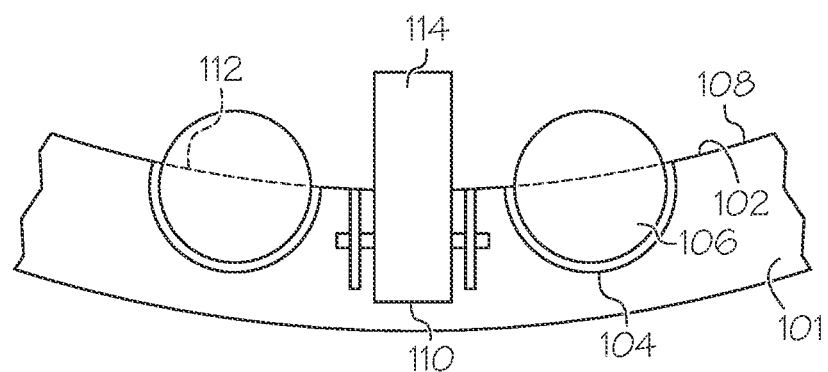
FIG. 4B schematically depicts a portion of the component depicted in FIG. 4A, according to one or more aspects of the present disclosure.
Figure 4C:
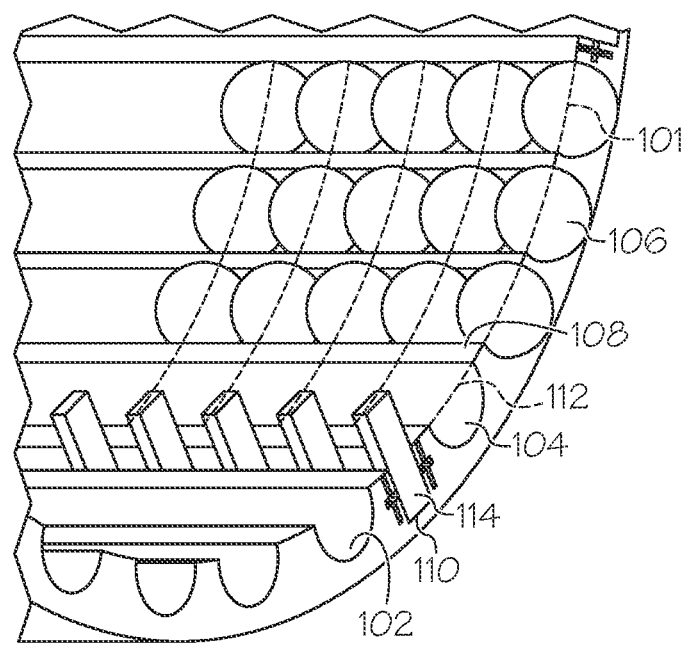
FIG. 4C schematically depicts a perspective view of a portion of the component depicted in FIG. 4A, according to one or more aspects of the present disclosure.

Referring now to FIGS. 4A-4C, a plurality of sub-assemblies 111 may be disposed within the component 100. As depicted in FIGS. 4A-4C, each sub-assembly 111 may be secured within the component 100 by disposing the metal spheres 106 within the channels 104, while also inserting the latches 114 within the latch grooves 110. Each sub-assembly 111 may be secured within the component 100 transverse relative to the channels 104 such that each of the metal spheres 106 of the individual sub-assemblies 111 are disposed in a different channel 104. As noted previously, the sub-assemblies 111 may be secured within the component 100 by slotting one or more latches 114 of the sub-assemblies 111 into the latch grooves 110 defined by the first surface 102. Once slotted into the latch grooves 110, each of the latches 114 may be secured within their respective latch grooves 110 by, for example, clamps, screws, clips, pins, interlocking surfaces, or combinations of these. When the sub-assembly 111 is disposed within the component 100, the coupling member 112 may be positioned along and contact the first surface 102. Depending on the depth of the channels 104, this placement of the coupling member 112 may enable about half of the volume of the metal spheres 106 to be disposed within the channels 104, which may result in uniform rotation and load balance of the metal spheres 106.

Referring again to FIG. 1, once fully assembled, the surface of the component 100 that contacts petroleum-based materials (also referred to as a contact surface) may include any portion of the first surface that has not been covered by the metal spheres 106, such as the ridges 108 or any unfilled channels 104, and any exposed portion of the surface of the metal spheres 106. The surface area of the contact surface of the fully assembled component 100 may be significantly greater than the surface area of the first surface 102 alone. That is, the installation of the metal spheres 106 within the channels 104 defined by the first surface 102 may significantly increase the surface area that contacts any petroleum-based materials passed through the component 100. For example, in embodiments, the contact surface of the fully assembled first component 100 may be at least 45 percent (%), at least 50%, at least 55%, at least 60%, at least 65%, at least 70%, or at least 75% greater than the surface area of the first surface 102 alone.

Without being bound by any particular theory, it is believed that such an increased surface area may reduce the time required for a petroleum-based material to be processed within the component 100, increase the yield of effluent from the component 100, or both. The time required for a petroleum-based material to be processed within the component 100 (that is, the residence time) may be determined by dividing the volume of the component 100 by the volumetric flow rate of the petroleum-based materials though the component 100. The inclusion of the metal spheres 106 within the component 100 may increase the contact surface of the component 100 while also reducing the volume of the component 100. As a result, the residence time of the petroleum-based material within the component 100 may be reduced without reducing the yield of the petrochemical processing system. That is, not only may the metal spheres reduce the formation and accumulation of solid deposits on the first surface 102, the metal spheres may also increase the yield and efficiency of the petrochemical processing system by increasing the surface area available for heat transfer to or from the petroleum-based materials.

Figure 5:
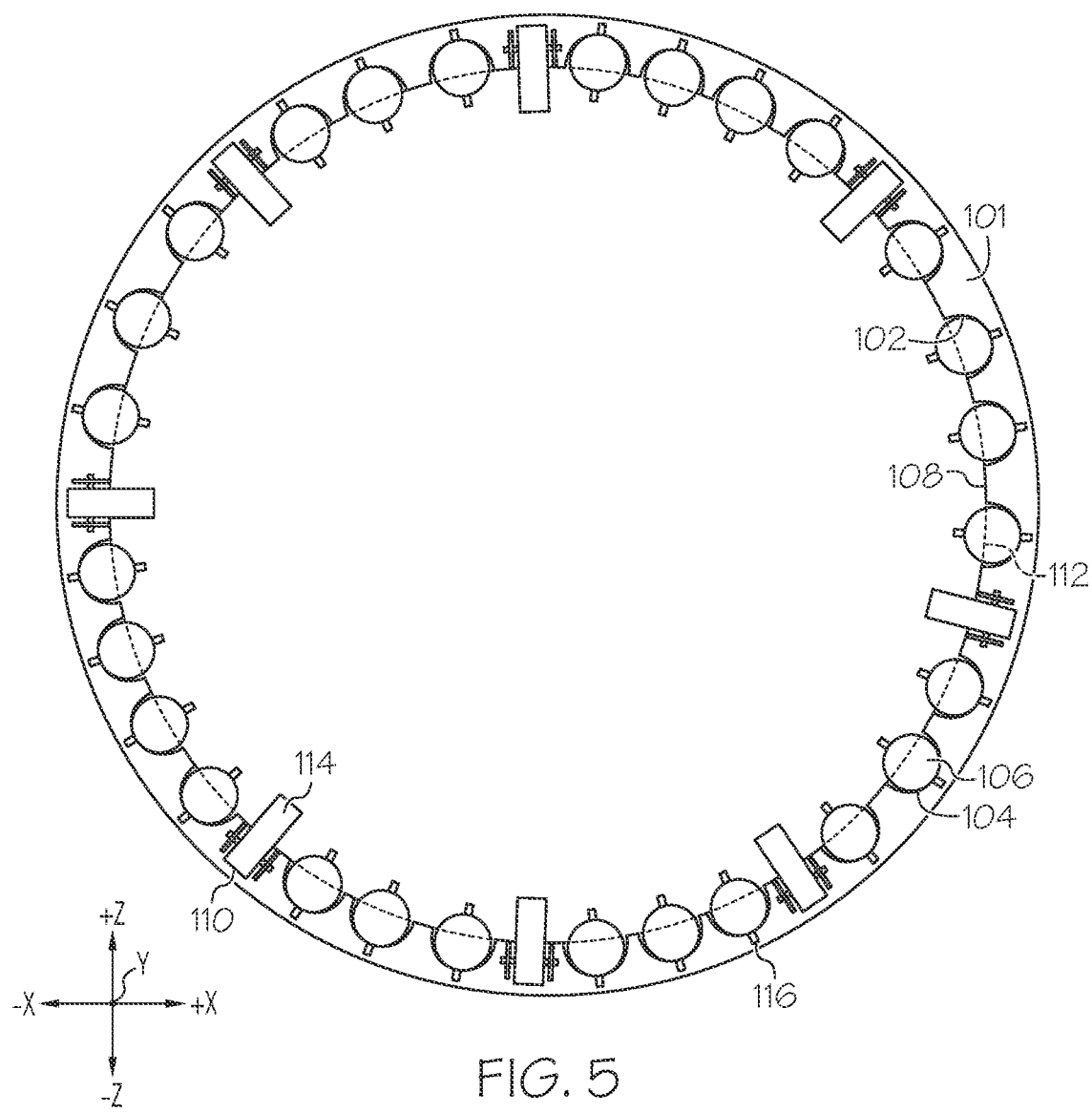
FIG. 5 schematically depicts a cross-section view of another component of a petrochemical processing system, according to one or more aspects of the present disclosure.

Referring now to FIG. 5, one or more of the first surface 102, the channels 104, and the metal spheres 106 may be further modified depending on the operating conditions of the petrochemical processing system. For example, as depicted in FIG. 5, the metal spheres 106 may further comprise metal wedges 116 that extend through the metal spheres 106. In embodiments, the metal wedge 116 may extend through a bore that extends all the way through the metal spheres 106 such that the metal wedges 116 protrudes from the metal sphere 106 at both ends of the bore. In embodiments, the metal wedge 116 may include one or more individual metal wedges that are coupled, such as welding, at antipodal points of the metal sphere 106. The bore or the antipodal points may be oriented along a diameter of the metal sphere 106 that is normal to the first surface 102. When the bore is oriented along such a diameter, the rotation speed of the metal sphere 106 about an axis that is perpendicular to a line normal to the first surface 102 may be increased by the metal wedge 116. The rotational speed may be increased by the force of the flowing fluids contacting the wedges. As a result, the dynamics of the first surface 102 may be further increased and the deposition and accumulation of solid deposits may be reduced. In such embodiments, the shape and dimensions of the channels 104 may also be further modified to accommodate the metal wedges 116 so as to not inhibit the free rotation of the metal spheres 106.

Referring again to FIG. 1, the component 100 may further comprise a second surface 118, which is opposite the first surface 102. In embodiments, the second surface 118 may comprise one or more additional elements that may facilitate the function of the component 100 within the petrochemical processing system. For example, in embodiments the second surface 118 may comprise one or more heat transfer elements 120, such as a heating coil, heat transfer fluid conduit, heating or cooling jacket, or other heat transfer element, or combinations of elements. The heat transfer elements 120 may facilitate the heating or cooling of the component 100 and, in particular, maintaining the contact surface of the component 100 at a temperature suitable for the processing of a petroleum-based material.

Additionally or alternatively, the second surface 118 may comprise a conducting element 122 electrically coupled to a power source and operable to conduct an electric current. Without being bound by any particular theory, it is believed that the passing of an electric current through the conducting element may generate a magnetic field within the component 100. The magnetic field may cause the metal spheres to rotate even when no petroleum-based materials are being passed through the component 100. Such induced rotation may be particularly useful in petrochemical processing systems, such as batch reactors, where the movement or flow rate of the petroleum-based materials through the component 100 is too slow to rotate the metal spheres 106.

Still referring to FIG. 1, methods for reducing deposition and accumulation of solid deposits, such as petroleum coke, during petrochemical processing may be conducted using the component 100 of the petrochemical processing system. As noted previously, the petrochemical processing system may include a component 100 including a first surface 102, which may define a plurality of channels 104. The component 100 may further include a plurality of metal spheres 106 disposed within the channels 104. The metal spheres 106 may be fixed in place within the channels 104 such that the positions of the metal spheres 106 are fixed, but the metal spheres 106 are freely rotatable. The component may also include any of the features, characteristics, or properties previously described in the present disclosure for the component 100. The method may comprise passing a hydrocarbon feed through a petrochemical processing system operable to heat the hydrocarbon feed to a temperature suitable to thermally crack hydrocarbons in the hydrocarbon feed and produce an effluent. As noted previously, the systems and methods of the present disclosure, which reduce the deposition and accumulation of solid deposits, may be applied to a variety of petrochemical processing systems, such as a visbreaker system, a supercritical water system, a steam pyrolysis system, an aqua-conversion system, or combinations of these. Accordingly, the effluent produced by the methods of the present disclosure may be a visbreaker effluent, a supercritical water effluent, a steam pyrolysis effluent, an aqua-conversion effluent, or combinations of these.

The hydrocarbon feed may comprise a mixture of petroleum-based materials. The petroleum-based materials of the hydrocarbon feed may comprise hydrocarbons derived from crude oil. The hydrocarbon feed may comprise crude oil, distillates, residues, tar sands, bitumen, atmospheric residue, vacuum gas oils, demetalized oils, naphtha streams, gas condensate streams, or combinations of these. The hydrocarbon feed may further comprise one or more non-hydrocarbon constituents, such as metal compounds, sulfur compounds, nitrogen compounds, inorganic compounds, or combinations of these. One or more supplemental feeds (not depicted) may be mixed with the hydrocarbon feed prior to introducing the hydrocarbon feed to the petrochemical processing system or introduced independently to the petrochemical processing system in addition to the hydrocarbon feed. For example, the hydrocarbon feed may comprise a naphtha stream and one or more supplemental streams, such as vacuum residue, atmospheric residue, vacuum gas oils, demetalized oils, gas condensate, or other hydrocarbon streams, or combinations of these.

In embodiments, the petrochemical processing system may be operable to heat the hydrocarbon feed to a temperature suitable to thermally crack hydrocarbons in the hydrocarbon feed and produce an effluent. The hydrocarbon feed may be heated by the petrochemical processing system and, in particular, the component 100 of the petrochemical processing system by one or more heating elements on the second surface 118 of the component 100. In embodiments, the hydrocarbon feed may be heated to a temperature of from 250° C. to 1,000° C. For example, the hydrocarbon feed may be heated to a temperature of from 250° C. to 875° C., from 250° C. to 750° C., from 250° C. to 625° C., from 250° C. to 500° C., from 250° C. to 375° C., from 375° C. to 1,000° C., from 375° C. to 875° C., from 375° C. to 750° C., from 375° C. to 625° C., from 375° C. to 500° C., from 500° C. to 1,000° C., from 500° C. to 875° C., from 500° C. to 750° C., from 500° C. to 625° C., from 625° C. to 1,000° C., from 625° C. to 875° C., from 625° C. to 750° C., from 750° C. to 1,000° C., from 750° C. to 875° C., or from 875° C. to 1,000° C.

The passing of the hydrocarbon feed through the petrochemical processing system and, in particular, the component 100 of the petrochemical processing system, may cause the metal spheres 106 of the component 100 to rotate. As noted previously, the rotation of the metal spheres 106 may reduce the deposition and accumulation of solid deposits on the first surface 102 of the component 100. Without being bound by any particular theory, it is believed that this reduction or prevention of the formation and accumulation of solid deposits on the first surface 102 may be due to the free rotation of the metal spheres 106 providing a dynamic heated surface that contacts the hydrocarbon feed. That is, as a result of the free rotation of the metal spheres 106, no single portion of the contact surface of the component 100 remains static for a time sufficient for solid deposits to be deposited or further accumulate.

In embodiments, the hydrocarbon feed may be passed through the component 100 at a relatively slow flow rate, or even remains static within the component 100, such as when the component 100 is a batch reactor. Such slow flow rates may be insufficient to rotate the metal spheres 106 or may result in the metal spheres 106 rotating at a speed slow enough for at least some deposition and accumulation of solid deposits to occur. In such embodiments, the rotation of the metal spheres 106 may be induced, the rotation speed of the metal spheres 106 may be increased, or both. The forced rotation of the metal spheres may be induced by, for example, the generation of a magnetic field within the component 100. As described previously, the outer surface 118 of the component 100 may include a conducting element 122, which may generate a magnetic field when an electric current is passed through it. As such, the method may further include applying an electric current to the conducting element 122. The application of the electric current may generate a magnetic field sufficient to rotate the metal spheres 106.

In embodiments, the metal spheres 106 may be rotated, either due to the flow of the hydrocarbon feed through the component 100, the forced rotation of the metal spheres 106 by the generation of a magnetic field, or both, at a rate sufficient to reduce the deposition and accumulation of solid deposits. The speed of the rotation may depend on the composition of the hydrocarbon feed and the propensity of the hydrocarbon feed to produce solid deposits, and may be determined during the initial operation of the petrochemical processing system. For example, a greater speed of rotation may be used when processing hydrocarbon feeds that produce greater amounts of solid deposits during processing. In contrast, lower speeds may be used when processing hydrocarbon feeds that produce less amounts of solid deposits during processing, which may reduce the wear of the metal spheres 106, the energy requirements to induce the forced rotation of the metal spheres 106, or both.

A first aspect of the present disclosure may include a petrochemical processing system including a component including a first surface oriented to contact a process fluid, where the first surface defines a plurality of channels; and a plurality of metal spheres disposed at least partially in the plurality of channels, where each of the plurality of metal spheres is fixed in place within one of the plurality of channels such that each of the plurality of metal spheres is freely rotatable.

A second aspect of the present disclosure may include a method for reducing accumulation and formation of solid deposits during petrochemical processing including passing a hydrocarbon feed through a petrochemical processing system operable to heat the hydrocarbon feed to a temperature suitable to thermally crack hydrocarbons in the hydrocarbon feed and produce an effluent, where the petrochemical processing system comprises: a component comprising a first surface oriented to contact the hydrocarbon feed, where the first surface defines a plurality of channels; and a plurality of metal spheres disposed at least partially within the plurality of channels, where each of the plurality of metal spheres is fixed in place within one of the plurality of channels such that each of the plurality of metal spheres is freely rotatable.

A third aspect of the present disclosure may include the second aspect, further including heating the hydrocarbon feed to a temperature of from 250° C. to 1,000° C. within the petrochemical processing system.

A fourth aspect of the present disclosure may include any one of the first through third aspects, where the component may further include a wall having the first surface.

A fifth aspect of the present disclosure may include any one of the first through fourth aspects, where the wall may include an alloy including nickel, chromium, copper, molybdenum, or combinations of these.

A sixth aspect of the present disclosure may include any one of the first through fifth aspects, where the component may further include a wall and an insert fixedly coupled to the wall, where the insert has the first surface.

A seventh aspect of the present disclosure may include any one of the first through sixth aspects, where the component may include a second surface opposite the first surface, the second surface including a heat transfer element.

An eighth aspect of the present disclosure may include any one of the first through sixth aspects, where the component may include a second surface opposite the first surface, the second surface including a conducting element that may be operable to receive an electric current, where the application of the electric current through the conducting element may generate a magnetic field that may cause rotation of the plurality of metal spheres.

A ninth aspect of the present disclosure may include any one of the first through eighth aspects, where each of the plurality of metal spheres may be coupled to the first surface by a coupling member that may extend through a bore oriented along a diameter of the metal sphere.

A tenth aspect of the present disclosure may include the ninth aspect, where the coupling member may include a metal ring or metal rod having a diameter of from 0.5 cm to 10 cm.

An eleventh aspect of the present disclosure may include either the ninth or tenth aspect, where the coupling member may include an alloy including nickel, chromium, copper, molybdenum, or combinations of these.

A twelfth aspect of the present disclosure may include any one of the first through eleventh aspects, where each metal sphere may have a diameter of from 1 cm to 20 cm.

A thirteenth aspect of the present disclosure may include any one of the first through twelfth aspects, where each metal sphere may have a density of from 5 g/cm$^3$ to 30 g/cm$^3$.

A fourteenth aspect of the present disclosure may include any one of the first through thirteenth aspects, where each metal sphere may have a hardness greater than or equal to 40 on the Rockwell "C" Scale.

A fifteenth aspect of the present disclosure may include any one of the first through fourteenth aspects, where each metal sphere may be heat treated at a temperature of from 750° C. to 1,500° C.

A sixteenth aspect of the present disclosure may include any one of the first through fifteenth aspects, where the plurality of metal spheres may include an alloy including nickel, chromium, copper, molybdenum, or combinations of these.

A seventeenth aspect of the present disclosure may include any one of the first through sixteenth aspects, where each of the plurality of metal spheres may include one or more metal wedges that extend through a bore oriented along a diameter of the metal sphere that is normal to the first surface.

An eighteenth aspect of the present disclosure may include any one of the first through seventeenth aspects, where the component may have a contact surface including exposed portions of the metal spheres and the first surface, and a surface area of the contact surface may be at least 45% greater than a surface area of the first surface.

A nineteenth aspect of the present disclosure may include any one of the first through eighteenth aspects, where the component may include a reactor, a furnace, a heat exchanger, a process line, or combinations of these.

A twentieth aspect of the present disclosure may include any one of the first through nineteenth aspects, where the petrochemical processing system may include a visbreaker system, a supercritical water system, a steam pyrolysis system, an aqua-conversion system, or combinations of these.

A twenty-first aspect of the present disclosure may include any one of the first through twentieth aspects, where each of the metal spheres may rotate about an axis that is perpendicular to a line normal to the first surface.

A twenty-second aspect of the present disclosure may include any one of the first through twenty-first aspects, where the channels may be semicircular shaped.

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A petrochemical processing system comprising:
   a component comprising a first surface oriented to contact a process fluid, where the first surface defines a plurality of channels aligned with a flow direction of the process fluid, wherein the plurality of channels are grooves recessed within the first surface; and
   a plurality of metal spheres disposed at least partially in the plurality of channels,
   where each of the plurality of metal spheres is fixed in place within one of the plurality of channels such that each of the plurality of metal spheres is freely rotatable at least about an axis perpendicular to the flow direction.

2. The petrochemical processing system of claim 1, where the component further comprises a wall having the first surface.

3. The petrochemical processing system of claim 1, where the component further comprises a wall and an insert fixedly coupled to the wall, where the insert has the first surface.

4. The petrochemical processing system of claim 1, where the component comprises a second surface opposite the first surface, the second surface comprising a heat transfer element.

5. The petrochemical processing system of claim 1, where the component comprises a second surface opposite the first surface, the second surface comprising a conducting element operable to receive an electric current, where the application of the electric current through the conducting element generates a magnetic field causing rotation of the plurality of metal spheres.

6. The petrochemical processing system of claim 1, where each of the plurality of metal spheres is coupled to the first surface by a coupling member that extends through a bore oriented along a diameter of the metal sphere.

7. The petrochemical processing system of claim 6, where the coupling member comprises a metal ring or metal rod having a diameter of from 0.5 centimeters to 10 centimeters.

8. The petrochemical processing system of claim 1, where each metal sphere has a diameter of from 1 centimeter to 20 centimeters.

9. The petrochemical processing system of claim 1, where each metal sphere has a density of from 5 grams per cubic centimeter to 30 grams per cubic centimeter.

10. The petrochemical processing system of claim 1, where each metal sphere has a hardness greater than or equal to 40 on the Rockwell "C" Scale.

11. The petrochemical processing system of claim 1, where each metal sphere has been heat treated at a temperature of from 750 degrees Celsius to 1,500 degrees Celsius.

12. The petrochemical processing system of claim 1, where the plurality of metal spheres comprise an alloy comprising nickel, chromium, copper, molybdenum, or combinations of these.

13. The petrochemical processing system of claim 1, where each of the plurality of metal spheres comprises one or more metal wedges that extend through a bore oriented along a diameter of the metal sphere that is normal to the first surface.

14. The petrochemical processing system of claim 1, where the component has a contact surface comprising exposed portions of the metal spheres and the first surface, and a surface area of the contact surface is at least 45 percent greater than a surface area of the first surface.

15. The petrochemical processing system of claim 1, where the component comprises a reactor, a furnace, a heat exchanger, a process line, or combinations of these.

16. The petrochemical processing system of claim 1, where the petrochemical processing system comprises a visbreaker system, a supercritical water system, a steam pyrolysis system, an aqua-conversion system, or combinations of these.

17. The petrochemical processing system of claim 1, where each of the metal spheres rotate about an axis that is perpendicular to a line normal to the first surface.

18. A method for reducing accumulation and formation of solid deposits during petrochemical processing, the method comprising:
   passing a hydrocarbon feed through a petrochemical processing system operable to heat the hydrocarbon feed to a temperature suitable to thermally crack hydrocarbons in the hydrocarbon feed and produce an effluent, where the petrochemical processing system comprises:

a component comprising a first surface oriented to contact the hydrocarbon feed, where the first surface defines a plurality of channels aligned with a flow direction of the process fluid, wherein the plurality of channels are grooves recessed within the first surface; and a plurality of metal spheres disposed at least partially within the plurality of channels, where each of the plurality of metal spheres is fixed in place within one of the plurality of channels such that each of the plurality of metal spheres is freely rotatable at least about an axis perpendicular to the flow direction.

19. The method of claim 18, further comprising heating the hydrocarbon feed to a temperature of from 250 degrees Celsius to 1,000 degrees Celsius within the petrochemical processing system.

20. The method of claim 18, where the component comprises a second surface opposite the first surface, the second surface comprising a conducting element operable to receive an electric current, and the method further comprising applying an electric current to the conducting element, where applying the electric current generates a magnetic field sufficient to rotate the plurality of metal spheres.

* * * * *